(12) United States Patent
Aase et al.

(10) Patent No.: US 8,056,961 B2
(45) Date of Patent: Nov. 15, 2011

(54) PEDESTRIAN IMPACT MITIGATION SYSTEM AND METHOD OF USE

(75) Inventors: Jan H. Aase, Oakland Township, MI (US); Alan L. Browne, Grosse Pointe, MI (US); Nancy L. Johnson, Northville, MI (US); Gary L. Jones, Farmington Hills, MI (US); Peter J. Gareau, Warren, MI (US); Hanif Muhammad, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 30 days.

(21) Appl. No.: 12/694,253

(22) Filed: Jan. 26, 2010

(65) Prior Publication Data

US 2011/0181073 A1 Jul. 28, 2011

(51) Int. Cl.
*B60R 21/00* (2006.01)
(52) U.S. Cl. .................................................. 296/187.04

(58) Field of Classification Search ............. 296/187.02, 296/187.03, 187.04, 187.07, 187.09; 293/24, 293/25, 26, 38, 118, 119, 102; 180/69.2, 180/69.21, 271, 274
See application file for complete search history.

(56) References Cited

U.S. PATENT DOCUMENTS

| | | | |
|---|---|---|---|
| 7,192,079 B2 * | 3/2007 | Schramm et al. | 296/187.04 |
| 7,374,231 B2 * | 5/2008 | Aase et al. | 296/187.02 |
| 7,637,559 B2 * | 12/2009 | Browne et al. | 296/187.02 |
| 7,757,804 B1 * | 7/2010 | Li | 180/274 |
| 2006/0186701 A1 * | 8/2006 | Browne et al. | 296/187.02 |

* cited by examiner

*Primary Examiner* — Dennis Pedder
*Assistant Examiner* — Jason S Daniels

(57) ABSTRACT

A system for and method of mitigating pedestrian impact utilizing an energy absorption member, such as an expandable honeycomb celled matrix, and at least one tether disposed within a recessed formation defined by the vehicle and interconnected to the member and a drive mechanism, wherein the member is selectively caused to extend and be spaced from an exterior surface.

12 Claims, 4 Drawing Sheets

PEDESTRIAN IMPACT MITIGATION SYSTEM AND METHOD OF USE

BACKGROUND OF THE INVENTION

1. Field of the Invention

The present disclosure generally relates to active energy absorption systems and methods of use; and more particularly to a selectively modifiable system/assembly that utilizes tethers disposed within recessed formations to drive an energy absorption member, such as an expandable honeycomb celled matrix, and to methods of absorbing energy by extending the member from the protected surface so as to intercept a projectile path prior to engaging the surface.

2. Discussion of Prior Art

Mitigating the frequency and consequences of pedestrian impact is of concern, especially when navigating urban thoroughfares and roadways with a vehicle. In the event that frontal impact with a pedestrian occurs, the upper torso and head of the pedestrian may rotate sufficiently to strike the hood and deform it sufficiently so that it may contact underlying structure proximate to the hood. An analytical simulation of force/acceleration as would occur before, during, and after a pedestrian headform strikes a vehicle hood, in accordance with IIHS (Insurance Institute for Highway Safety) testing standards and procedures, is generally provided in hidden-line type at prior art FIG. 1.

Energy absorption systems have been developed to minimize the effect of a crash event, and include both passive and active (i.e., the selective modification of the crash energy absorption characteristics of a component, assembly, or region, such as the hood) operation. Contrary to passive structures/systems, which occupy a maximum volume in the uncrushed/unstroked initial state, active systems generally expand, move, or otherwise reconfigure in response to a triggering event so as to facilitate storage in the stowed condition.

One category of active energy absorbing/occupant protection systems employs an open-celled planar member. For example, a selectively expandable honeycomb celled matrix, such as disclosed in co-owned U.S. Pat. No. 7,374,231, has been developed for use within the vehicle environment to provide impact energy management and/or occupant protection (through force and deceleration limiting) substantially parallel to the cellular axis both within and with respect to the external structure of the vehicle. These systems provide energy absorption when the vehicle encounters a projectile. With respect to pedestrian impact, for example, FIG. 1 further shows in continuous-line type a prediction from an analytical simulation of the force/acceleration experienced by a pedestrian headform, again in accordance with IIHS testing standards, when a honeycomb celled matrix is first overlaid upon the hood, so as to initially engage and absorb energy from the headform. As reflected in the graph, the matrix reduced the peak force experienced by the headform in comparison to that predicted by the analytical simulation for the case of no matrix shown in hidden-line type.

However, due to packaging concerns caused by the crowded spaces underneath the hood and more importantly the fact that analytical simulations suggest that filling empty regions under the hood would not be effective in mitigating the consequences of pedestrian impact, such measures have not been implemented with respect to the under hood region and pedestrian impact. There remains a need in the art for an improved method of implementing an active energy absorption system relative and exterior to the hood.

BRIEF SUMMARY OF THE INVENTION

The present invention presents a novel crash-mitigation system that addresses the aforementioned packaging and location concerns, in application with the hood, and therefore provides added benefit and is advantageous over the prior art. As such, the system is particularly adapted for mitigating pedestrian impact with the hood. The system is useful for reducing packaging concerns by utilizing existing seams formed by the hood and/or other vehicle body parts, and enabling the absorbing member to be stored in a more spacious environment, such as behind the front grille. The system is further useful for providing greater energy absorption capability when deployed, in comparison to prior art systems/assemblies because of being exterior to the hood in its deployed state.

In a first aspect of the invention, a crash-mitigation system that absorbs kinetic energy during an impact with at least a portion of a body or projectile, wherein the body defines a projected path towards an external surface of the vehicle, is presented. The system includes an energy absorption member reconfigurable between first and second conditions, wherein the member is stowed in the first condition, and extends from the vehicle, so as to intercept the path in the second condition. The system further includes an actuator drivenly coupled to the member, and operable to selectively cause the member to shift from the first and to the second condition, and a controller programmably configured to determine a pre-crash or crash event and cause the actuator to shift the member from the first to the second condition when the event is determined.

In a second and independent aspect of the invention, an assembly adapted for selectively modifying the energy absorption capacity of one or more of its components includes first and second adjacent components defining a recessed seam, channel, or otherwise formation, and an energy absorption member secured relative to said one or more components, and shiftable between first and second conditions wherein the member causes the afore-mentioned first and second capacities, respectively. The assembly further includes an actuator drivenly coupled to the member, and operable to selectively cause the member to shift between the conditions. The actuator includes a drive mechanism and at least one tether, cable, or other form of physical linkage interconnecting the mechanism and member, wherein the tether is entrained within the formation.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 3c is a cross-section of the tether and channel defined by the hood, shown at A-A in FIG. 3a.

DETAILED DESCRIPTION OF THE INVENTION

Figure 1:
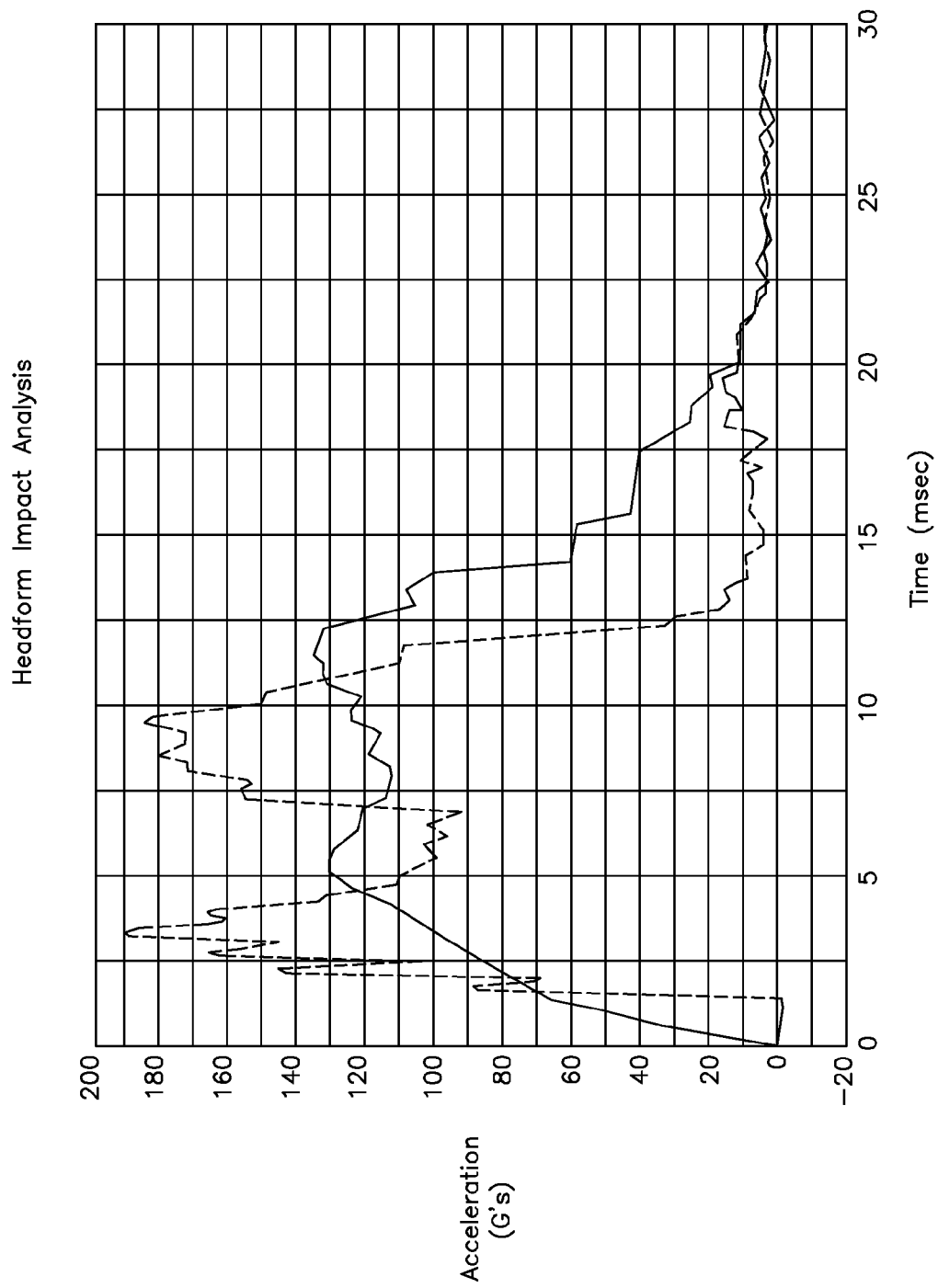
FIG. 1 is a graph showing force/acceleration over time generated by an analytical simulation suggestive of that which would be experienced by the head of a pedestrian striking a vehicle hood, wherein energy absorption is not provided (in hidden-line type) and wherein an open-celled matrix was initially overlaid onto the exterior surface of the hood (in continuous-line type)
Figure 2:
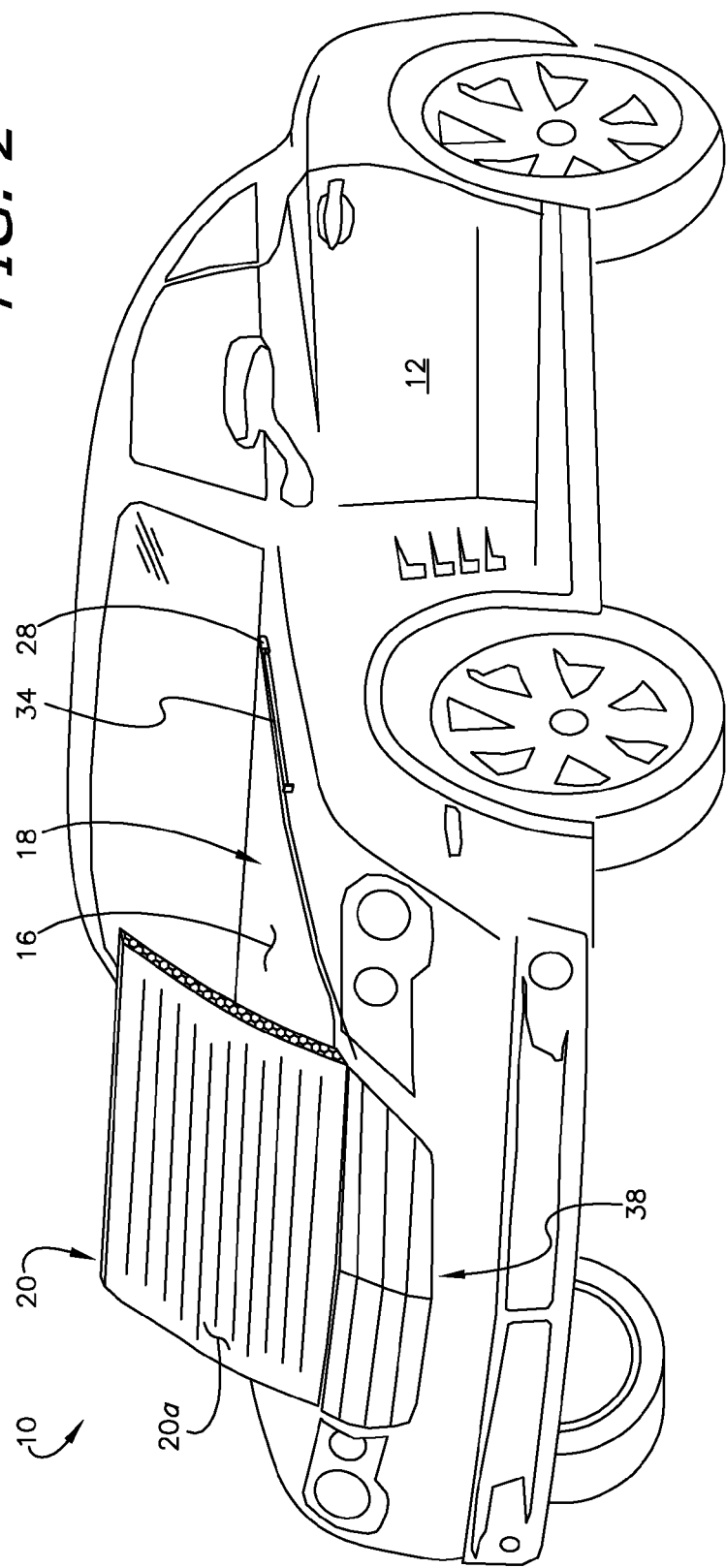
FIG. 2 is a perspective view of a vehicle, particularly illustrating the hood and front grille thereof, and a pedestrian impact mitigation system associated therewith, in accordance with a preferred embodiment of the invention.

The following description of preferred embodiments is merely exemplary in nature and is in no way intended to limit the invention, its application, or uses. As shown in FIGS. 2-4, the present invention concerns an energy absorption system 10 adapted for use with a vehicle 12. In the first aspect, the system 10 is more particularly suited for absorbing kinetic energy from a projectile 14 (e.g., the head of a pedestrian, etc.) having a projected path or trajectory directed towards an exterior surface 16 of the vehicle 12. It is appreciated that the projectile 14 may include inanimate objects.

The exterior surface 16 of primary concern is defined by the hood 18 of the vehicle 12, so that the system 10 is particularly suited to mitigate pedestrian impact events. It is certainly within the ambit of the invention, however, to utilize the benefits and advantageous of the system 10 with other applications, such as with respect to boating, and in conjunction with other vehicle components. That is to say, the system 10, particularly with respect to the second aspect of the invention, may be configurable for use with any vehicular body part including the front grille, fenders, hood, deck lids, quarter panels, doors, and combinations thereof, so as to change the force/deflection characteristic associated with projectile interaction with that component.

Figure 3A:
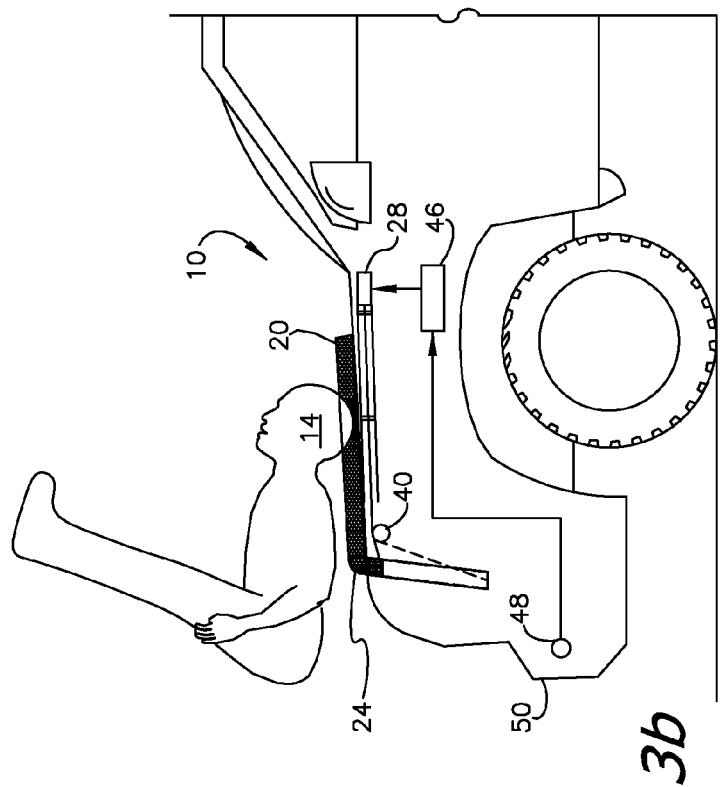
FIG. 3a is a side elevation of the front of a vehicle, and energy absorption system including an expandable honeycomb celled matrix in stowed (hidden-line type) and deployed conditions, a tether disposed within a recessed formation defined by the vehicle, and a drive mechanism, in accordance with a preferred embodiment of the invention, wherein a pedestrian is being struck by the vehicle and engaged by the system.
Figure 3B:
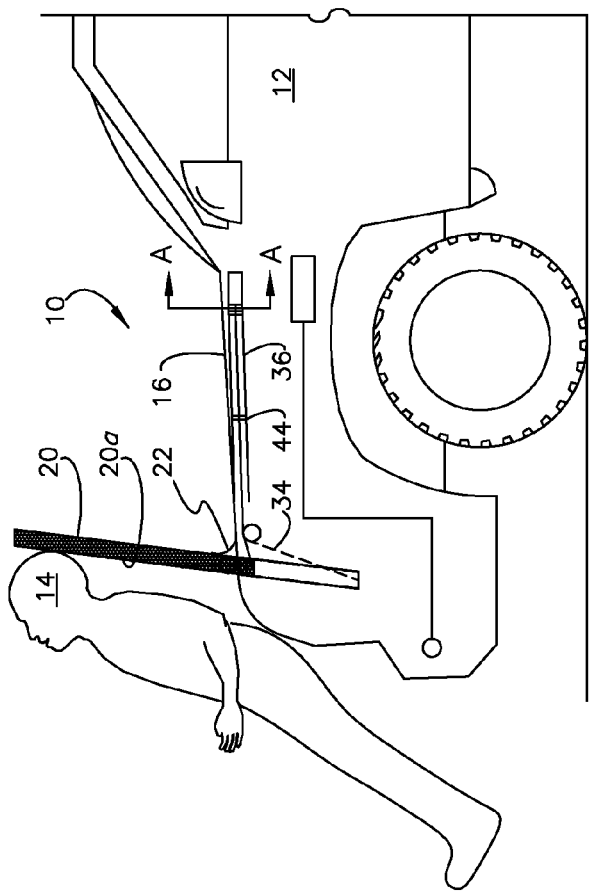
FIG. 3b is a subsequent side elevation of the vehicle, pedestrian, and system shown in FIG. 3a after the member has been bent.
Figure 3C:
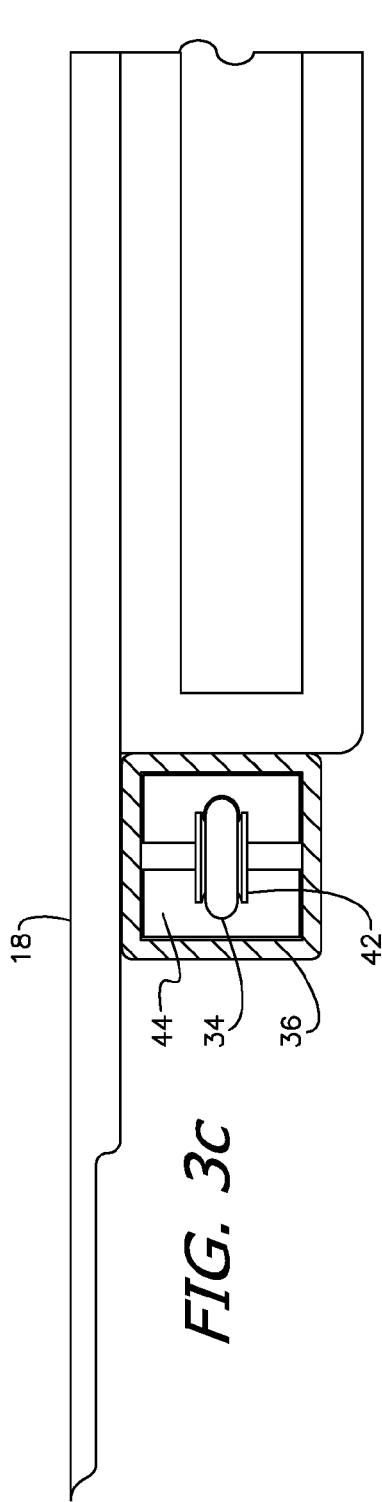
Figure 4:
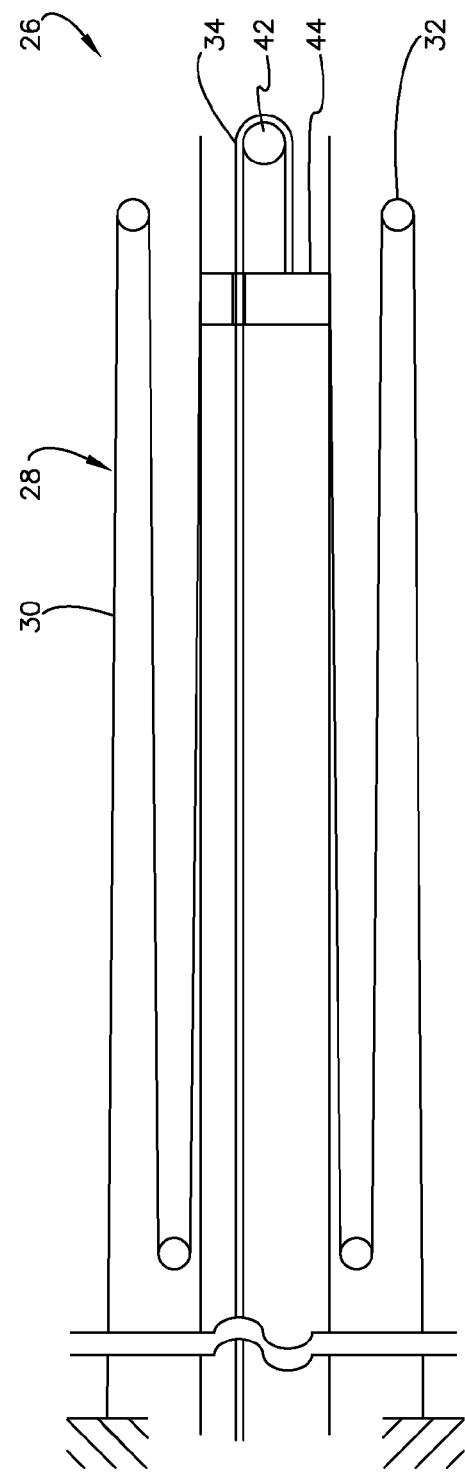
FIG. 4 is a plan view of a channel, tether, block, and shape memory wire drive mechanism engaging the block, in accordance with a preferred embodiment of the invention.

As shown in the illustrated embodiment, the system 10 generally includes at least one energy absorption member 20 that is reconfigurable between first and second conditions, wherein the member 20 is stowed in the first condition, and preferably is exterior to and can even extend from the vehicle 12, so as to intercept the projectile path in the second condition (FIGS. 2-3b). That is to say, the member 20 is translatable, collapsible, pivotal, and/or otherwise shiftable, so as to achieve differing first and second positions, orientations, and/or shapes with respect to the surface 16. In the first aspect of the invention, the member 20 and surface 16 are cooperatively configured such that an angle not greater than ninety, and more preferably not greater than sixty degrees, is formed thereby, when the member 20 is extended (FIGS. 2, 3a). That is to say, in this aspect of the invention, the member 20 does not overlay or fill a void defined by the protected structural component, as does conventional absorption systems. Rather the member 20 is stowed within a space defined by one or more structural components in the stowed condition, said component(s) preferably defining a break-away seam and including an overlaying pivotal or flexible flap 22 (FIG. 3a). The system 10 is configured such that the member 20 is able to displace the flap 22, when caused to shift to the deployed condition (FIG. 3a).

In a preferred embodiment, the member 20 comprises an open-celled matrix, such as the honeycomb celled matrix disclosed in the '231 patent, and incorporated by reference herein. It is appreciated, however, that other energy absorbing materials or constructs may be used. To enable energy absorption and deformation by the interstitial honeycomb cells, it is appreciated that the initially engaging outer cover 20a of the member 20 is conformable. As shown in FIG. 3a, and further disclosed in the '231 patent, the preferred matrix 20 is selectively expandable from a collapsed state in the stowed condition to a longitudinally expanded state in the deployed condition, so as to facilitate packaging when not in use, and as such, preferably presents fixed and translatable opposite end caps. In FIGS. 3a,b, the expanded state presents a matrix height approximately twice the height of the collapsed state. In this configuration, the flap 22 may further serve to retain the member 20 in the collapsed state. Braking the seal and removing the obstruction, by driving the member 20 towards the deployed condition, enables the member 20 to expand.

The preferred member 20 defines a resistively bendable region 24 that takes advantage of the spacing between the member 20 and surface 16 (FIG. 3a). More particularly, at least a portion of the member 20 is configured so as to be caused to resistively bend through the angle defined by the member 20 and surface 16, when the projectile 14 engages the member 20. This further absorbs energy from the projectile 14 prior to the member 20 reaching the surface 16. In a preferred embodiment, FIG. 3a shows a resistive (e.g., spring-biased) hinge 24 at the base of the deployed matrix 20. The hinge 24 presents a bending stiffness sufficient to retain the member 20 in the upright orientation prior to engagement with the projectile 14, and during the absorption of energy by the member material (e.g., cellular matrix). More preferably, the region (e.g., hinge, etc.) 24 and member 20 are cooperatively configured such that the material completes its absorptive contribution prior to bending the region 24. Alternatively, the member 20 may simply present a cross-sectional bending modulus sufficient to effect the intended timing. In this configuration, at least a portion of the member 20 is preferably retained within the storage space when deployed, so that the hood 18 (or otherwise component) provides the necessary leverage.

The system 10 further includes an actuator 26 comprising a drive mechanism 28 that is drivenly coupled to the member 20 (FIG. 3a-4). The actuator 26 is operable to selectively cause the member 20 to achieve the first and/or second conditions. Where the member 20 is expandable, the preferred drive mechanism 28 is further operable to cause the member 20 to volumetrically reconfigure. It is appreciated that where one time or infrequent use is contemplated, such as with respect to crash events, the actuator 26 needs only to provide one-way actuation. The preferred system 10 may then be taken to the appropriate repair facility to be reset and/or replaced. Otherwise, it is appreciated that a return mechanism (not shown) may be readily implemented by those of ordinary skill in the art.

Given the necessary reaction times for effective operation in crash and pedestrian impact applications, it is appreciated that the actuator 26 must provide a minimum actuation force and achieve deployment within a maximum period. In a preferred embodiment, the drive mechanism 28 includes an active material element 30 such as a shape memory alloy or an electroactive polymer operable to undergo a reversible change in fundamental property when exposed to or occluded from an activation signal, and the change causes the member 20 to shift. The element 30 may be rapidly activated to effect direct displacement of the member 20, to transfer kinetic energy to the member 20, so as to achieve a greater displacement than the available shape memory/strain, or to release stored energy, e.g., within a compression spring, drivenly engaging the member 20.

For example, as shown in FIG. 4, a shape memory alloy wire 30, of sufficient length to effect the necessary displacement, may be drivenly coupled to the member 20 and Joule heated by the vehicle charging system (not shown). Where packaging is a concern, the wire 30 may be doubled over fixed prongs 32, as shown in FIG. 4, to provide the necessary length. The wire 30 is preferably primed and maintained at a temperature just below transition, so as to enable a more rapid response. To that end, it is appreciated, in an under hood application that heat by-product generated from the engine (not shown) may be utilized to selectively heat the wire 30. Alternatively, the drive mechanism 28 may include a pyrotechnic device configured to directly propel the member 20 or through the heat generated actuate a thermally activated element 28.

In a second and independent aspect of the invention, the actuator 26 further includes at least one tether 34 that interconnects the member 20 and drive mechanism 28, wherein the term "tether" shall be deemed to include cables, ropes, wires, chains, links, and equivalent tensile forms, and is disposed within a recessed formation (e.g., seam, channel, etc.) 36 defined by adjacent components. Alternatively, rigid elements, such as rods (not shown) may be used where flexibility is not a concern. For example, in the embodiment shown in FIGS. 2, 3a,b, first and second tethers 34 are connected to the base of the member 20, which is stowed behind the grille 38 of the vehicle 12; the tethers 34 are entrained along the cut lines, and more preferably within channels 36 formed at the lateral sides of the hood 18 and redirected by pulleys 40 located near the grille 38. At the end opposite the member 20, each tether 34 may be doubled over a second low friction pulley 42 and then connected to a contact block 44 configured to linearly travel within the respective channel 36. The tether 34 may initially pass through a hole defined by the block 44. As previously mentioned, the drive mechanism 28 (e.g., an active material element, pyrotechnic device, and/or compression spring, etc.) may be disposed within or along the channel 36 and selectively caused to transfer energy to the block 44, so as to cause the block 44, tether 34, and member 20 to rapidly travel.

Where necessary a latching mechanism (not shown) may be provided to retain the member 20 in the deployed condition. It is appreciated, however, that a biasing spring within the channel 36 may serve this function. In an alternative embodiment, the actuator 26 may be directly coupled to the flap 22 or another latching mechanism configured to retain a spring-biased member 20 in the stowed condition. Actuation in this configuration breaks the seal and releases the flap 22, enabling the member 20 to instantaneously deploy.

Finally, the system 10 preferably includes a controller 46 communicatively coupled to the actuator 26, and programmably configured to deploy the member 20, when a pre-crash or crash event is determined (FIG. 3b). As such, the preferred system 10 further includes at least one sensor 48 operable to detect a condition and communicatively coupled to the controller 46, such that the controller 46 is configured to determine the event, based in part on the detection of the condition. It is appreciated that deployment could be triggered alternatively by signals from a pre-crash warning system, from crash sensors, or be a mechanical response to the crash itself. For example, and as shown in FIGS. 3a,b, the sensors 48 may be associated with and operable to detect contact with the bumper 50 of the vehicle 12, or compose a front vision system or short range radar. In this configuration, the controller 46 is operable to deploy the member 20, when a pedestrian profile and/or contact with the bumper 50 is determined.

As used herein the term "active material" shall be afforded its ordinary meaning as understood by those of ordinary skill in the art, and includes any material or composite that exhibits a reversible change in a fundamental (e.g., chemical or intrinsic physical) property, when exposed to or occluded from an activation signal. Suitable active materials for use with the present invention include but are not limited to shape memory materials (e.g., shape memory alloys, ferromagnetic shape memory alloys, electro-active polymers (EAP), piezoelectrics, etc.). It is appreciated that these types of active materials have the ability to rapidly displace, or remember their original shape and/or elastic modulus, which can subsequently be recalled by applying an external stimulus.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement are inclusive of the endpoints and independently combinable.

What is claimed is:

1. A pedestrian impact mitigation system adapted for use with a vehicle, and for absorbing kinetic energy during an impact with a projectile, wherein the projectile defines a projected path towards an external surface of the vehicle, said system comprising:
   an energy absorption member reconfigurable between first and second conditions, wherein the member is stowed in the first condition, and extends from and exterior to the vehicle, so as to intercept the path in the second condition;
   an actuator drivenly coupled to the member, and operable to selectively cause the member to shift from the first and to the second condition; and
   a controller communicatively coupled to the actuator, and operable to determine a pre-crash or crash event and cause the actuator to shift the member, when the event is determined,
   wherein the member defines a resistively bendable region, such that at least a portion of the member is caused to bend as a result of and thereby further absorbs energy from the impact, and the region includes a spring-biased hinge.

2. The system as claimed in claim 1, wherein the member defines a honeycomb celled matrix.

3. The system as claimed in claim 2, wherein the matrix is selectively expandable, and presents a collapsed state in the stowed condition.

4. The system as claimed in claim 1, wherein the actuator includes an active material element operable to undergo a reversible change in fundamental property when exposed to or occluded from an activation signal, and the change causes the panel to shift from the first condition to the second condition.

5. The system as claimed in claim 1, wherein the actuator includes a pyrotechnic drive.

6. The system as claimed in claim 1, wherein the actuator includes a drive mechanism and at least one tether interconnecting the member and mechanism.

7. The system as claimed in claim 6, wherein the mechanism includes a stored energy spring.

8. The system as claimed in claim 1, further comprising:
a sensor operable to detect a condition and communicatively coupled to the controller, said controller being configured to determine the event, when the condition is detected.

9. The system as claimed in claim 8, wherein vehicle includes a bumper, and the sensor is associated with and operable to detect contact with the bumper.

10. The system as claimed in claim 1, wherein the member, and surface are cooperatively configured to define an angle not greater than ninety degrees when in the second condition.

11. An assembly adapted for selectively modifying an energy absorption capacity, said assembly comprising:
first and second adjacent components defining a recessed seam;
an energy absorption member secured relative to the components, and shiftable between first and second conditions wherein the member causes at least a portion of the components to present first and second capacities, respectively;
an actuator drivenly coupled to the member, operable to selectively cause the member to shift between the conditions, and including a drive mechanism and at least one tether interconnecting the mechanism and member, wherein the tether is entrained within the seam; and
a controller communicatively coupled to the actuator, and operable to determine an event and cause the actuator to shift the member, when the event is determined,
wherein at least one of the components defines a breakaway seam and includes a flap, and the member is stored within said at least one of the components and displaces the flap when caused to shift between the conditions.

12. The assembly as claimed in claim 11, wherein the components include body parts selected from the group consisting essentially of the hood, front grille, fenders, trunk lid, doors, or quarter panels of the vehicle.

* * * * *